(12) United States Patent
Scheckelhoff et al.

(10) Patent No.: US 8,127,903 B2
(45) Date of Patent: Mar. 6, 2012

(54) INTEGRAL LIGHT WEIGHT SPRING BRAKE ACTUATOR AND MOUNT

(75) Inventors: Kenneth E. Scheckelhoff, Elyria, OH (US); Ron Plantan, Elyria, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 12/723,227

(22) Filed: Mar. 12, 2010

(65) Prior Publication Data

US 2011/0221152 A1    Sep. 15, 2011

(51) Int. Cl.
*F16D 51/00* (2006.01)
(52) U.S. Cl. .................. 188/329; 188/341; 92/98 R
(58) Field of Classification Search ............. 188/153 D, 188/205 R, 206 R, 209, 329, 330, 341; 92/63, 92/130 A, 130 D, 98 R
See application file for complete search history.

(56) References Cited

U.S. PATENT DOCUMENTS

| | | | | |
|---|---|---|---|---|
| 3,076,531 | A | * | 2/1963 | Fisher et al. ............. 188/205 R |
| 3,137,361 | A | | 6/1964 | Randol |
| 3,431,031 | A | * | 3/1969 | Ike ..................................... 303/9 |
| 3,497,037 | A | * | 2/1970 | Deibel ........................ 188/329 |
| 3,707,208 | A | * | 12/1972 | Kyllonen ..................... 188/202 |
| 4,685,299 | A | | 8/1987 | Myers et al. |
| 4,754,857 | A | | 7/1988 | Urban |
| 4,907,678 | A | * | 3/1990 | Urban ............................. 188/78 |
| 5,070,830 | A | | 12/1991 | Malven et al. |
| 5,957,032 | A | | 9/1999 | Hicks |
| 6,062,124 | A | | 5/2000 | Zmyslowski |
| 6,405,635 | B1 | | 6/2002 | Smith et al. |
| 7,055,662 | B1 | | 6/2006 | Jones et al. |

OTHER PUBLICATIONS

International Search Report dated May 5, 2011 (Two (2) pages).

* cited by examiner

*Primary Examiner* — Christopher Schwartz
(74) *Attorney, Agent, or Firm* — Crowell & Moring LLP

(57) ABSTRACT

An improved integral spring brake actuator and mount is provided in which a portion of the spring brake actuator is integrally formed with a connecting flange and a brake cam shaft support tube. The improved integral spring brake actuator and mount is significantly lighter than previous multi-part built-up spring brake actuators and mounting brackets, decreasing vehicle weight, eliminating the need for costly high-quality welding and lowering manufacturing costs. The integral spring brake actuator and mount may be formed from cast aluminum.

9 Claims, 2 Drawing Sheets

INTEGRAL LIGHT WEIGHT SPRING BRAKE ACTUATOR AND MOUNT

BACKGROUND AND SUMMARY OF THE INVENTION

The present invention relates to brake actuators used on, for example, commercial truck axles. More specifically, the present invention relates to a new approach to brake actuator design, assembly and in-service mounting.

So-called "spring brake" actuators are commonly used to provide service, parking and emergency brake operation on vehicles such as commercial trucks, tractors and trailers equipped with lever-operated drum or disc brakes. Spring-type brake actuators are typically pneumatically operated, and are supplied with operating air from a compressed air source on the vehicle. These actuators also typically are arranged in a "fail-safe" manner, i.e., where the actuator defaults to a brake application state upon loss of operating air pressure.

An example prior art spring brake actuator is shown in cross-section view in prior art FIG. 1. Actuator housing 1 includes a rear cylinder 2 in which a rear piston 3 is displaceably arranged. The inner wall of the rear cylinder and a chamber-side of the rear piston define a rear ventilation chamber 4. The other side of the rear piston bears on a brake actuator spring 5. This spring is also known in the art as a "power spring" or a "parking brake spring," and these terms may be used interchangeably. The rear ventilation chamber is isolated from the spring side of piston 3 by a diaphragm 6. An intermediate flange 8 (also known as a "wall") separates rear cylinder 2 from a front cylinder 9. The intermediate flange 8 traversed by a sliding rod 11, formed affixed to rear piston 3 with the diaphragm 6 captured therebetween. The sliding rod 11 can be displaced in the intermediate flange 8 by the rear piston. A front ventilation chamber 7 within front cylinder 9 is delimited by the cylinder inner wall and a front piston 13 and annular diaphragm 14. The rear piston 3 and the front piston 13 are in non-coupled contact with one another by means of the sliding rod 11, such that the front piston 13 can be displaced in a brake application direction by the rear piston 3. An actuating rod 15 for actuating a brake lever of a vehicle brake is provided on the front side of the front piston 13.

When no pneumatic pressure is present in the FIG. 1 actuator, the brake actuation spring 5 applies a high spring force to rear piston 3, which in turn applies this force via sliding rod 11 to front piston 13 to cause the actuator rod 15 to apply the vehicle brake. In this state, the vehicle brake functions as a parking brake, preventing vehicle movement. When release of the parking brake is desired, the rear ventilation chamber 4 is filled with compressed air via a port (not illustrated). As the force generated by the increasing air pressure on the front side of rear piston 3 exceeds the force generated by brake application spring 5, the rear piston 3 and sliding rod 11 move toward the rear of the rear cylinder 2, compressing spring 5. At the same time, as sliding rod 11 moves towards the rear, the force previously applied to front piston 13 is relieved, and the return spring 18 biases the front piston 13 toward the rear of front cylinder 9, thereby withdrawing actuating rod 15 away from and releasing the vehicle brake. The vehicle therefore moves from a state in which it is braked by the brake actuator spring 5, to a non-braked state in which the vehicle may be moved.

The vehicle brake is applied as a service brake during normal operation by admitting compressed air into the front ventilation chamber 7 (via a port not shown in FIG. 1). Because air pressure in rear ventilation chamber 4 continues to hold sliding rod 11 at the rear of the rear cylinder 2, the front piston 13 and actuating rod 15 are free to move forward and backward within the front cylinder as necessary to respond to the operator's brake actuation demands. In the event of failure of the compressed-air supply during operation of the vehicle, the pressure in the rear ventilation chamber 4 decreases. As a result, the brake actuation spring 5 automatically pushes the rear piston 3 back to the starting (parking) position. Sliding rod 11 thus presses on the front piston 13, which in turn pushes the actuating rod 15 in the brake application direction to actuate the vehicle brake. Thus, fail-safe emergency operation of the vehicle brake is assured.

As one of ordinary skill in the art will readily recognize, the brake actuator is typically mounted on an axle side of a wheel brake, essentially parallel to the brake backing plate, so that the actuator's actuating rod can push on a brake application lever of the wheel brake. The actuating rod uses the brake application lever to convert linear rod motion into rotation of a brake cam shaft to which the brake application lever is affixed. The rotation of the cam shaft, which passes through an aperture in the wheel brake's backing plate, causes cam elements on the wheel side of the wheel brake to force brake shoes radially outward to contact an inner surface of the wheel brake's brake drum and thereby slow the vehicle. In typical prior art commercial vehicle drum brake installations, the brake cam shaft is supported outside of the wheel brake by a steel tube affixed by fasteners to the axle side of the brake's backing plate. The fasteners pass through a thick steel plate which is welded to the outer diameter of the steel tube, and at the end of the steel tube away from the brake backing plate, another thick steel bracket shaped to receive a typical brake actuator as in FIG. 1 is welded to the steel tube.

Due to the use of thick steel material throughout the typical prior art cam shaft supporting arm and its attached steel brackets, this built-up component is undesirably heavy, typically on the order of 13 pounds per brake actuator, or 78 pounds per three-axle vehicle. Moreover, even with the use of such thick, heavy components, these prior art mounting systems have been known to have natural vibration frequencies which are excited in certain situations, such as when used with wide-based tire-equipped vehicles.

The use of quality steel components in the prior art cam shaft supports also results in undesirably high material costs, as well as high costs in manufacture where the completed assemblies of support tubes and attached brackets must be built-up by welding, and this precision build-up work must be performed using multiple costly alignment jigs, each jig being custom developed to provide built-up assemblies tailor-made to suit specific customer brake and axle combinations.

In view of the foregoing, it is an objective of the present invention to provide an improved integrated brake actuator and an improved approach to mounting brake actuators in in-service environments, in which weight, cost, ease of manufacture, installation and maintenance are improved over prior spring brake actuator and actuator mounting designs.

In addressing these and other objectives, the present invention provides a solution to the problems of the prior art by taking an approach which is contrary to the conventional arrangements in the prior art. Specifically, where prior art spring brake actuators have typically been built up from separate rear and front chambers (both chambers typically made from steel), and then the completed brake actuator assembly has been bolted to a custom-built-up steel cam shaft support and bracket assembly, in the present invention the front chamber of the brake actuator is formed from aluminum as part of an integral casting which combines the front chamber with a cast cam shaft support tube via an integrated bracket arm.

In a further embodiment, rather than using a welded-on mounting plate for bolting the cam shaft support tube to the wheel brake backing plate, bosses for fasteners are also integrally molded with the one-piece actuator front chamber and support tube casting to increase structural strength and vibration resistance of these mounting features.

Advantages of the present invention include the elimination of prior art variations in the alignment of the steel mounting brackets previously welded to the steel cam shaft support tube, as well as the potential for human errors, such as the use of the wrong custom-built assembly jig when fulfilling a customer order. The present invention also eliminates the need for creating and maintaining an inventory of custom assembly jigs by use of fixed casting molds.

Eliminating the need for custom-built assembly jigs and the need for manual build-up of the prior art cam shaft support tube assemblies results in the substantial cost savings in manufacturing equipment, skilled labor and defective parts costs. In addition, use of cast aluminum costly allows for elimination of costly welding equipment, the need for skilled welders and/or robotic welding equipment, and the need for a post-manufacture protective coating, such as the paint required to protect a typical prior art steel support tube and welded bracket assembly.

The use of lightweight aluminum also provides for a significant reduction in component weight, contributing to lower overall vehicle weight and consequent fuel savings. For example, preliminary design work has indicated that on a typical three-axle commercial tractor vehicle, use of the inventive integrated cast spring brake actuator and cam shaft tube unit may result in an overall weight reduction of approximately 40-50 pounds.

The casting of the front chamber of the spring brake actuator with the cam shaft support tube further provides the advantage of automatically moving the chamber forces to the wall of the cast front chamber, which is the preferred location for both structural reasons (e.g., stress distribution and improved fatigue life) and weight optimization. This approach also eliminates the need to provide the threaded fasteners and appropriately reinforced locating features of prior art spring brake actuators which were required to mount the brake actuator to the steel bracket carried by the prior art cam shaft support tube, further decreasing costs and manufacturing complexity. The inventive arrangement also shifts the natural vibration frequency away from that of prior art brackets, minimizing natural excitation when used, for example, with wide-based tires.

A further advantage of the present invention is that an assembled integrated cast spring brake actuator and cam shaft support tube unit would ease assembly and help minimize manufacturing costs for vehicle original equipment manufacturers who do not receive so-called "fully dressed" axles from axle subassembly suppliers, but instead choose to integrate brakes to axles during manufacturing line operations (i.e., having a single integrated brake actuator and cam shaft support tube unit to affix to a wheel brake, eliminating separate, multi-component pre-assembly steps.

Alternative embodiments of the inventive actuator and support tube casting arrangements include, for example, integrated casting of either the rear chamber or the intermediate flange with the bracket arms connecting with the cast support tube. Similarly, alternative materials to cast aluminum may be used, such as titanium, zinc alloy or lightweight cast iron, however, such lightweight materials typically not cost-effective as a practical matter.

The present invention thus provides an integrated spring brake actuator and cam shaft support tube unit which provide very significant axle and vehicle weight savings and elimination of manufacturing difficulty, reliance on skilled workers, time consuming and expensive welding processes, need for precision assembly and multiple custom-built assembly jigs, while maintaining high strength and vibration resistance and being price competitive with conventional heavy steel built-up brake actuator and support tube assemblies, particularly in view of the large reduction in the brake system's contribution to overall vehicle weight.

Other objects, advantages and novel features of the present invention will become apparent from the following detailed description of the invention when considered in conjunction with the accompanying drawings.

DETAILED DESCRIPTION OF THE DRAWINGS

Figure 1:
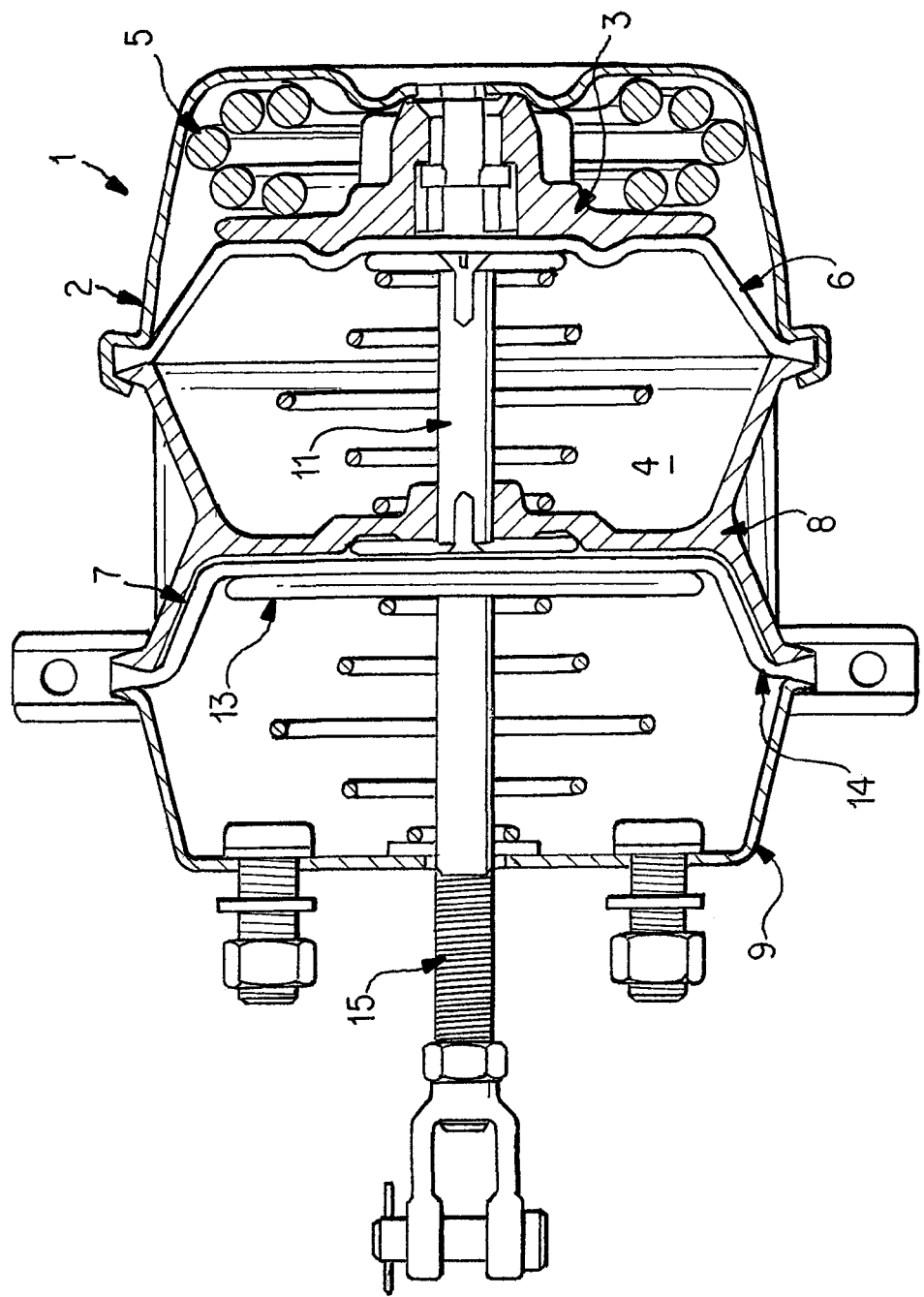
FIG. 1 is a cross-section view of an example prior art spring-type pneumatic brake actuator.
Figure 2:
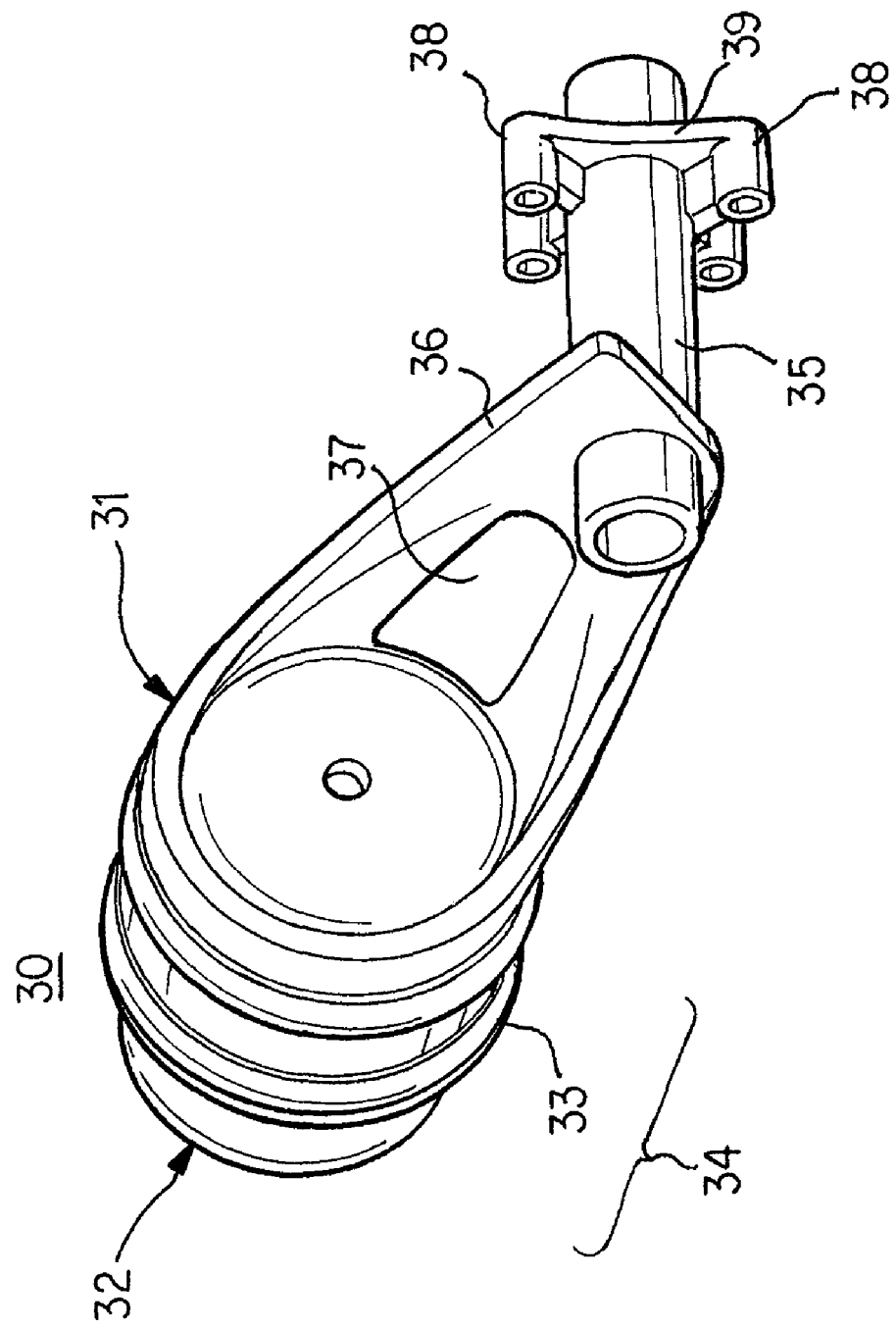
FIG. 2 is an oblique view of an embodiment of an integrated spring brake actuator and brake cam shaft support tube in accordance with an embodiment of the present invention.

FIG. 2 is an oblique view of an integrated spring brake actuator and brake cam shaft support tube unit 30 in accordance with the present invention. The integral unit 30 includes a cast aluminum front chamber portion 31, to which the spring brake's rear chamber 32 and intermediate flange 33 are assembled to form a completed spring brake actuator 34. The front chamber portion 31 includes a through-hole at its center through which the spring brake actuator's operating rod 40 (not shown in FIG. 2) passes when the actuator's components are assembled to the front chamber portion 31. It is contemplated that the assembly of the front chamber and rear chamber is done using any standard method of clamping or crimping, however, other methods may be used.

The one-piece aluminum casting further includes a brake cam shaft support tube portion 35 which is connected to the front chamber portion 31 by a connecting flange 36. Appropriate stress analysis would permit one of ordinary skill in the art to size and shape the connecting flange 36 as needed to place material of appropriate thickness and width between the support tube section 35 and the front chamber portion 31 such that successful handling of maximum loading stresses and sufficient fatigue life may be assured. In one embodiment, a flange thickness of 7/16 inch met all lifetime performance criteria. Stress analyses may also be used to determined whether the light weight integral cast unit's connecting flange 36 may be further lightened by inclusion of a weight reducing hole, such as the two holes 37 shown in FIG. 2.

The cam shaft support tube portion 35 may be expected to be slightly larger in diameter than a corresponding prior art steel support tube in order to meet design requirements for strength and fatigue life, however, preliminary calculations have established that the increase in diameter, on the order of 1/4 inch of wall thickness, is not so large as to cause interference with other brake, wheel and/or axle components.

At the wheel brake end of the cast support tube 35, in lieu of the prior art's typical welded-on steel mounting flange there are proved at least one (in this embodiment, four) integral mounting bosses 38. Each of the bosses has an axial bore through which mounting fasteners (not illustrated) pass to secure the integrated unit 30 to the wheel brake (not illustrated). By virtue of their being integrally cast with the support tube portion 35, as well as being provided with reinforcing ribs 39, the bosses 38 are both strong and highly resistant to vibration.

The foregoing disclosure has been set forth merely to illustrate the invention and is not intended to be limiting. For example, the support tube portion of the inventive integrated unit need not have a circular inner profile, so long as the brake cam shaft may be rotated therein to operate the wheel brake. Another example is that the present invention is not limited to strictly one-piece castings, in the sense that use of separate parts for some features, such as a separate ring carrying the mounting bosses (for example, a cast mounting boss ring which mates with a corresponding surface feature of the support tube portion) would be within the present invention's scope of providing a new remarkably light weight brake actuation unit integrating a spring brake actuator housing portion in one-piece with a cam shaft support tube casting. Because other such modifications of the disclosed embodiments incorporating the spirit and substance of the invention may occur to persons skilled in the art, the invention should be construed to include everything within the scope of the appended claims and equivalents thereof.

What is claimed is:

1. An integral spring brake actuator and mount, comprising:
   a spring brake actuator front housing chamber portion configured to enclose at least a portion of the actuator;
   a brake cam shaft support tube portion; and
   a connecting flange portion,
   wherein the spring brake actuator front housing chamber portion is integrally formed as a one-piece unit with the connecting flange portion and the brake cam shaft support tube portion, the connecting flange portion connecting the spring brake actuator front housing chamber portion and the brake cam shaft support tube portion.

2. The integral spring brake actuator mount of claim 1, wherein the one-piece unit is formed from cast aluminum.

3. The integral spring brake actuator mount of claim 2, wherein the spring brake actuator front chamber portion includes an aperture for passage of a brake operating rod of the spring brake actuator.

4. The integral spring brake actuator mount of claim 1, further comprising
   at least one mounting boss,
   wherein the at least one mounting boss is integrally formed with the cam shaft support tube.

5. The integral spring brake actuator mount of claim 1, further comprising
   at least one mounting boss,
   wherein the at least one mounting boss is affixed to the one-piece unit.

6. An integral spring brake actuator and mount, comprising:
   a spring brake actuator front housing chamber portion configured to enclose at least a portion of the actuator;
   a spring brake actuator rear chamber element;
   a brake cam shaft support tube portion; and
   a connecting flange portion,
   wherein
      the spring brake actuator front housing chamber portion is integrally formed as a one-piece unit with the connecting flange portion and the brake cam shaft support tube portion, the connecting flange portion connecting the spring brake actuator front housing chamber portion and the brake cam shaft support tube portion, and
      the spring brake actuator rear chamber element is affixed to the spring brake actuator front housing chamber portion.

7. The integral spring brake actuator and mount of claim 6, wherein the one-piece unit is formed from cast aluminum.

8. An axle assembly, comprising:
   an axle housing having a wheel brake disposed at least one end;
   an integral spring brake actuator and mount, including
      a spring brake actuator front housing chamber portion configured to enclose at least a portion of the actuator;
      a spring brake actuator rear chamber element;
      a brake cam shaft support tube portion; and
      a connecting flange portion,
      wherein
         the spring brake actuator front housing chamber portion is formed as a one-piece unit with the connecting flange portion and the brake cam shaft support tube portion, the connecting flange portion connecting the spring brake actuator front housing chamber portion and the brake cam shaft support tube portion, and
         the spring brake actuator rear chamber element is affixed to the spring brake actuator front chamber portion, and
         the integral spring brake actuator and mount is affixed to the wheel brake in a manner which permits a spring brake actuator mechanism disposed within the spring brake actuator front housing chamber portion and the spring brake actuator rear chamber element to operate the wheel brake.

9. The axle assembly of claim 8, wherein the one-piece unit is formed from cast aluminum.

* * * * *